United States Patent [19]

Tenzer

[11] Patent Number: 4,666,497

[45] Date of Patent: May 19, 1987

[54] BIOACTIVATING SYSTEM FOR INCREASED PLANT GROWTH AND YIELDS

[75] Inventor: Abraham I. Tenzer, Longwood, Fla.

[73] Assignee: Bio-Organics, Inc., New York, N.Y.

[21] Appl. No.: 793,649

[22] Filed: Oct. 31, 1985

Related U.S. Application Data

[63] Continuation-in-part of Ser. No. 538,985, Oct. 4, 1983, Pat. No. 4,551,164.

[51] Int. Cl.$^4$ .......................... C05F 11/08; C05F 11/10
[52] U.S. Cl. ................................................ 71/6; 71/7; 71/12; 71/13; 435/253; 435/856
[58] Field of Search ............................ 71/6, 7, 12, 13; 435/253, 856

[56] References Cited

U.S. PATENT DOCUMENTS 4,551,164 11/1985 Tenzer ...................................... 71/6

OTHER PUBLICATIONS

D. D. Mathur et al., *Florida Foliage,* vol. 10, No. 7, pp. 22–23 (Jul. 1984).

*Primary Examiner*—Ferris H. Lander
*Attorney, Agent, or Firm*—Bernard, Rothwell & Brown

[57] ABSTRACT

Cultivation of a microorganism in a nutrient medium including disrupted sea kelp or a sea kelp extract produces a bioactivating fermentation product which promotes growth and yields when applied to plants. A composition containing such bioactivating fermentation product and an acidification extraction product of humic acid is readily absorbed by plant foliage when sprayed on plants.

56 Claims, No Drawings

BIOACTIVATING SYSTEM FOR INCREASED PLANT GROWTH AND YIELDS

BACKGROUND OF THE INVENTION

Cross-Reference to Related Application

This application is a continuation-in-part of copending U.S. patent application Ser. No. 538,985, filed Oct. 4, 1983, now U.S. Pat. No. 4,551,164, Nov. 5, 1985.

FIELD OF THE INVENTION

The present invention relates to a plant growth-promoting composition and a method for promoting the growth and yield of plants utilizing the composition.

DESCRIPTION OF THE BACKGROUND ART

Since man first began cultivating plant life, there has been an interest in promoting plant growth and increasing yields.

Various avenues have been pursued in attempts to promote plant growth. The use of microbes to achieve this result has been of great interest, particularly the use of nitrogen-fixing bacteria. Various means have been devised for contacting the roots of plants with nitrogen-fixing bacteria, including inoculation of soil with such bacteria and treating seeds with bacteria-containing compositions.

Various other microorganisms have been utilized in improving soil conditions and hence plant growth.

There remains a continuing interest in developing new methods and means for improving plant productivity.

SUMMARY OF THE INVENTION

A method for preparing a bioactivating composition for increased plant growth and yields comprises growing a microorganism in a first nutrient medium under growth conditions to a cell density of from about $2 \times 10^6$ to about $4 \times 10^6$ cells/ml, adding to the first nutrient medium from about 1% to about 10% by weight of disrupted sea kelp or sea kelp extract to form a second nutrient medium, and further growing the microorganism in the second nutrient medium under growth conditions to a second cell density of about $5 \times 10^6$ cells/ml or greater; the growth conditions including a physiologically acceptable pH and temperature. A mixture containing the bioactivating composition and a humic acid derivative is readily absorbed by plant foliage. The invention further relates to a plant growth-promoting composition and method for promoting growth of plants using the composition.

DETAILED DESCRIPTION OF THE PREFERRED EMBODIMENTS

According to the invention, a bioactivating composition for increased plant growth and yield is produced by novel cultivation of a microorganism. According to one embodiment, the microorganism is a bacterium, e.g., of the genus *Actinomyces*. *Actinomyces roseus* and *Actinomyces gypsoides* are particularly preferred microorganisms for use according to the present invention.

It has surprisingly been discovered that selective introduction of disrupted sea kelp or sea kelp extract into a fermentation medium during the cultivation of a microorganism, such as an *Actinomyces* microorganism, produces a fermentation product having potent plant growth-promoting activity. Although the invention will be further described with reference to *Actinomyces* microorganisms, it is to be understood that the invention is applicable to other microorganisms as well.

Sea kelp, including *Phaeophyta*, have heretofor had commercial value due to their relatively large content of hydrophilic colloidal polysaccharides. For use as a component in a fermentation medium, the cellular structure of the sea kelp should be disrupted by mechanical or other means. For example, the sea kelp can be dried and pulverized or ground to produce a disrupted sea kelp product. A preferred sea kelp for use according to this invention is Laminaria.

According to one embodiment of this invention, a sea kelp extract is utilized as a component in a microorganism fermentation medium. Suitable sea kelp extracts for use according to the invention include aqueous extracts of disrupted sea kelp. Sea kelp extracts contain hormones such as cytokinins, indolic acid, numerous trace elements and other materials. There are several commercial sources for sea kelp extract, including Wachters Organic Sea Products, S. San Francisco, Calif. and P. Ohrstom and Sons, Arlington Heights, Ill. A preferred sea kelp extract is Wachters' Sea-Spraa TM. While sea kelp extract alone has been found to enhance germination and first leaf growth of plants, it has not been found to have a long-lasting growth-promoting effect.

According to the invention, a microorganism such as *Actinomyces roseus*, *Actinomyces gypsoides* or a mixture thereof, is first added to a nutrient medium including assimilable sources of carbon and nitrogen but free of disrupted sea kelp or sea kelp extract, to achieve a cell density of from about $2 \times 10^6$ to about $4 \times 10^6$ cells/ml. To the nutrient medium then is added from about 1% to about 10% by weight disrupted sea kelp or sea kelp extract, and the microorganism is further grown in the culture under growth conditions to achieve a cell density of about $5 \times 10^6$ cells/ml or greater. The growth conditions include a physiologically acceptable pH and temperature.

After the culture has achieved a cell density of about $5 \times 10^6$ cells/ml or greater, insolubles can be removed from the culture, e.g., by centrifugation, to provide an aqueous bioactivating composition according to the invention.

In a preferred embodiment, the microorganism is grown to a cell density of from about $2.5 \times 10^6$ to about $3.5 \times 10^6$ cells/ml prior to adding sea kelp or sea kelp extract, more preferably to a cell density of from about $2.7 \times 10^6$ to about $3.3 \times 10^6$ cells/ml, and most preferably to a cell density of about $3 \times 10^6$ cells/ml.

In preferred embodiments, sea kelp extract is added to the nutrient medium to achieve a concentration of from about 2% to about 7% by weight, most preferably about 5% by weight.

After addition of disrupted sea kelp or sea kelp extract to the nutrient medium, the microorganism is preferably grown to a cell density of from about $5.5 \times 10^6$ to about $7.5 \times 10^6$ cells/ml, most preferably to a cell density of from about $6 \times 10^6$ to about $7 \times 10^6$ cells/ml.

In a particularly preferred embodiment, lactose is the primary carbon source during the fermentation. An *Actinomyces* microorganism is initially grown in a nutrient medium at a pH of about 6.8-7 and containing about 3.5% by volume lactose, for about 24 hours at about 35° C. to substantially deplete the lactose. The pH of the fermentation medium then is adjusted to about 6.8-7.0 and about 5-6% by volume lactose is added to the fermentation medium. The fermentation medium then is incubated about 8–10 hours at about 35° C. to achieve a cell count of about $3 \times 10^6$ cells/ml. Then about 5% by weight of sea kelp extract is added to the fermentation medium and the microorganism then is grown in the fermentation medium incubated at a temperature of about 38°–40° C. for a period of about 16 hours at a pH of about 6.2–6.5 to achieve a cell count of from about $6 \times 10^6$ to about $7 \times 10^6$ cells/ml. Insolubles are then removed from the culture, e.g., by centrifugation, to provide an aqueous bioactivating composition according to the invention. The growth-promoting effect of *Actinomyces* alone has been tested, but found to be substantially inferior to the bioactivating fermentation product according to this invention.

According to one embodiment, a bioactivating composition according to the present invention is administered to plants conventionally via the root system to enhance growth and yields of the plants.

According to a preferred embodiment, the bioactivating composition according to the invention is sprayed directly on plant foliage (foliar application) to increase plant growth and yield. Advantageously, the composition is mixed with a suitable carrier, such as water, to dilute the composition to a suitable concentration to facilitate uniform application of the composition to foliage. Absorption of the composition by foliage is promoted by the addition of up to about 20% by weight of one or more non-toxic foliar surfactants commonly used in the agriculture industry for application of materials such as herbicides to plant foliage. Other non-toxic foliar penetrants or wetting agents may also be used as absorption-promoters. Suitable absorption-promoting additives may include non-toxic anionic, cationic and nonionic surfactants, such as Ortho TM 77X. Polyethylene glycol, and a product of the acidification extraction of humic acid (humic acid derivative) may also be used to promote absorption.

Humic acid is an alkali-soluble, acid-insoluble extract from coal or other humic substances, such as shales, peat, muck and animal manure. Humic acid is a commercially available product which has heretofor been used to improve soil conditions. A natural crude humic acid powder composition is sold by American Colloid Company of Skokie, Ill., U.S.A. under the trade name "Agro-Lig." Agro-Lig TM is made from a naturally occurring mineral commonly called Leonardite consisting principally of crude humic acid (80% minimum on a dry matter basis) and minor levels of gypsum, lignitic coal, and clays.

A product of acidification extraction of humic acid has surprisingly been found to be an excellent carrier of nutrients and other growth-promoting materials which facilitates absorption of materials by plant foliage and dispersion of the materials throughout the plant.

Preferably, natural crude humic acid composition is subjected to an acidification process to produce an absorption-promoting material for use according to the invention. Natural crude humic acid powder composition (such as Agro-Lig TM) is mixed with an acid (e.g., HCl or citric acid) to form a slurry and allowed to react for 4 to 6 weeks. The aqueous portion is removed and the sedimented product is utilized as an absorption-promoting agent according to the invention.

A particularly preferred absorption-promoting agent is a carboxylate derivative of humic acid obtained by mixing 2 parts natural crude humic acid powder composition, e.g., Agro-Lig TM, with 1 part of a mixture comprising about 85% by weight Technical Grade HCl and 15% by weight 2-p-methoxy phenyl ethylene bromide, to form a slurry. The slurry is allowed to react for 4–6 weeks, during which a solvolysis reaction takes place wherein the 2-p-methoxy phenyl ethylene bromide is converted to 2-p-methoxy phenyl ethylene chloride, and a by-product of the humic acid powder composition is formed as a precipitate. The sedimented benzene carboxylic acid extraction by-product (carboxylate derivative containing about 13% humic acid) then is separated from the aqueous portion for use as an absorption-promoting agent according to the invention. This carboxylate derivative of humic acid has a pH in the range of 3–4 and a carboxylate number of 150–570 meq/100g.

According to one embodiment, the bioactivating fermentation product of the invention is combined with the humic acid derivative in a respective ratio of from about 5:2 to about 8:2 by weight. Such a growth-promoting composition is readily absorbed by plant foliage to carry the bioactivating material throughout the plant and thereby enhance plant growth and yield. Preferably, a bioactivating composition according to the invention includes up to about 5% by weight (solids) humic acid derivative, more preferable from about 0.1% to about 3% by weight, and most preferably from about 0.3% by weight.

A humic acid/Actinomyces extract composition according to the invention, when sprayed on plants in amounts of 1 ml/gal/week to cover and saturate the foliage surfaces, results in a substantial increase in growth rate of the treated plants. For example, spraying the humic acid/bioactivating composition on young citrus trees resulted in about a 65% increase in total dry weight of leaves over control and more than a 75% increase in total leaf surface area over control. Such substantial increases in growth rate rapidly deplete nutrients available to the plants, resulting in plants which outgrow the available nutrients in the absence of additional nutrients (e.g., fertilizer).

Without being bound to any particular theory, it is believed that the microorganism extract enhances the activity of key enzymes of the plant which are involved in the metabolism of nutrients to form sugars and utilize sugars as a source of energy. Such enzymes include Phosphofructo Kinase, ATP-dependent and pyrophosphate-dependent enzymes. Phosphofructo Kinase activity has been shown to be substantially increased by the bioactivating composition of this invention. For example, the bioactivating composition has been shown to more than double the activity of ATP-dependent Phosphofructo Kinase, and increase the activity if Pyrophosphate-dependent Phosphofructo Kinase by five-fold. The increase in enzyme activity is believed to be responsible for an increase in the efficiency of nutrient (e.g., fertilizer) metabolism, and may also increase the ability of plants to utilize nutrients.

Since leaf photosynthesis is a linear function of leaf nitrogen content, maximum benefit of application of the composition of this invention is achieved by increasing available nutrients (including nitrogen) to the plants. The additional nutrients can be introduced to the plants by conventional means (e.g., through the root system), or nutrients can be mixed with the composition of this invention and applied to the foliage in a spray to promote absorption of the nutrients directly into the foliage.

Advantageously, a plant growth-promoting composition according to the invention includes nutrient materials necessary for plant photosynthesis and plant growth, such as materials capable of providing assimilable nitrogen (N), phosphorous (P) and potassium (K) to the plant. For convenience, commercially available fertilizer material can be added to the composition to provide assimilable nitrogen, phosphorous and potassium in, for example, an N-P-K ratio of 14:7:3. The composition also advantageously includes trace elements such as molybdenum, selenium, and boron. The trace elements are advantageously in the form of chelates formed with, for example, ethylenediaminetetraacetic acid (EDTA). Trace element chelates are commercially available, and are preferably present in a composition according to the invention in a ratio with respect to the bioactivating fermentation product component of from about 1:10 to about 1:20. The trace element chelates are preferably present in a composition according to this invention in amounts within the range of from about 0.1% to about 1% by weight, more preferable about 0.5% by weight.

For spraying a plant growth-promoting composition according to the invention on plant foliage, the composition is preferably mixed with water to achieve a microorganism extract:water ratio of from about 1:8 to about 1:15, respectively, and applied to plant foliage in a growth-promoting amount. This amount will vary, depending on the climatic and soil conditions, and the particular crop involved Generally, from about 0.2 lb. to about 1 lb. bioactivating composition per acre is employed, preferably from about ¼ lb. to about ½ lb. per acre.

In another embodiment, a composition according to the invention comprises humic acid or a humic acid derivative as defined above, and a mixture of bacteria and algae. A suitable mixture of bacteria and algae for use in a composition according to this invention is described in U.S. patent application Ser. No. 538,985, filed Oct. 4, 1983 (now allowed) and incorporated herein by reference. Preferred bacteria for use according to this embodiment are of the genera *Escherichia* and *Bacillus*, with *B. subtilis* being particularly preferred because of its non-pathogenicity. Algal components of the composition are preferably of the division *Chlorophyta* (green algae), with algae of the order *Chlorococcales* being more preferred. Algae of the genus *Chlorella* are particularly preferred, with *Chlorella saccharophilia* being most preferred.

The algae and bacteria are preferably present in the microbial mixture in a cellular ratio respectively of from about 10:1 to 1:1, with a respective ratio of from about 5:1 to about 1:1 being more preferred, and a respective ratio of from about 5:1 to about 2:1 being most preferred. The ratio of humic acid or humic acid derivative to microorganism mixture in a composition according to this embodiment is preferably from about 1:2 to about 1:200 by weight, more preferably from about 1:65 to about 1:85 by weight. A plant bioactivating composition according to this embodiment advantageously includes a stabilizing amount of soresepinum (an extract from yucca, obtainable from Ritter Bros., International, Los Angeles, Calif., U.S.A). The concentration of soresepinum in the composition is preferably from about 0.01% to about 0.1% by weight, most preferably between about 0.03% and about 0.07% by weight. A plant growth-promoting composition according to this embodiment is preferably dispersed in an aqueous solution to facilitate uniform applications of the composition to foliage. The aqueous composition-containing mixture is sprayed on plants in a growth-promoting amount. This amount will vary, as noted above, but generally is from about 0.2 lb. to about 1 lb. per acre, preferably from about ¼ lb. to about ¾ lb. per acre.

The present invention provides a composition which enhances plant growth rate and which can be applied effectively directly to plant foliage. The composition is not only useful for promoting the growth of normal healthy plants but has also proven quite useful for promoting the rapid recovery of plants which have been damaged, e.g., by frost.

The invention is further illustrated by the following examples which are not intended to be limiting.

EXAMPLE I

Samples of *Actinomyces roseus, Actinoymces gypsoides,* or mixtures thereof were added to an enrichment medium of lauryl tryptose broth (Difco #0241-02-7, Difco, Detroit, Mich., U.S.A.) containing about 3.5% by volume lactose at a pH of about 6.8–7.0. The mixture was incubated at a temperature of about 35° C. ±1° C. for about 24 hours to complete replacement of lactose by $CO_2$. The pH of the mixture then was adjusted to between about 6.8–7.0 with the aid of a pH-sensitive dye (Bright Green Laboratory Bile, Difco #007-01-2) and about 5–6% by volume lactose was added to the mixture. The mixture then was incubated at a temperature of about ±1° C. for about 8–10 hours to achieve a cell count of about $3 \times 10^6$ cells/ml. To the mixture was then added about 5% by weight sea kelp extract (Wachters' Sea-Spraa ™) and the mixture was incubated at about 38°–40° C. for a period of about 16 hours at a pH of between about 6.2–6.5 to achieve a cell count of about $6-7 \times 10^6$ cells/ml. The culture then was centrifuged to separate the insolubles from the aqueous portion, and the aqueous portion (bioactivating composition) was isolated.

EXAMPLE II

The bioactivating composition prepared according to Example I (supra) was mixed with water (1 ml bioactivating composition/gal. water), and about 2% by weight of a carboxylate derivative of humic acid was added to the mixture.

The carboxylate derivative of humic acid was obtained by mixing two parts natural crude humic acid powder composition (Agro-Lig ™, American Colloid Company, Skokie, Ill., U.S.A.) made from Leonardite shale, an organic substance mined in South Dakota, with one part of a mixture comprising 85% by weight Technical Grade HCl and 15% by weight 2-p-methoxy phenyl ethylene bromide, to form a slurry. The slurry was allowed to react for about five weeks, during which a solvolysis reaction takes place wherein the 2-p-methoxy phenyl ethylene bromide is converted to 2-p-methoxy phenyl ethylene chloride, and a by-product of the humic acid powder composition is formed as a precipitate. The sedimented product (carboxylate derivatives) was separated from the aqueous portion and mixed with the bioactivating composition as set forth above.

The bioactivating composition/water/humic acid derivative mixture, or plain water (control), was sprayed on young citrus trees once a week for about 6 months to cover and saturate the foliage surfaces of the young trees. The results are shown in Table A below:

TABLE A

Comparison* of Two Young Citrus trees

| Characteristic Measured | Tree treated Bioactivating Composition | Control Tree (water only) |
|---|---|---|
| 1. Total leaf number | 42 | 55 |
| 2. Total leaf surface area (dm$^2$) | 14.8 | 8.34 |
| 3. Phosphofruto Kinase Activity (n moles of Fruito 6-P/ min/mg protein) | | |
| ATP-dependent | 14.9 | 6.5 |
| Pyrophosphate-dependent | 4.5 | 0.9 |
| 4. Dry weight (mg/dm$^2$) | 7.48 | 8.07 |
| 5. Total dry weight (leaves) (g) | 110.7 | 67.3 |

*All comparisons are for new branch growth only.

The results show about a 65% increase in total dry weight of leaves over control, more than 75% increase in total leaf surface area over control, a more than two-fold increase in ATP-dependent Phosphofructo Kinase activity over control, and a fivefold increase in Pyrophosphate-dependent Phosphofructo Kinase activity over control. The substantial increase in growth rate of the treated tree over control apparently depleted available nutrients to the treated tree, i.e., the tree outgrew available nutrients, indicating the advantages of supplying additional nutrients (e.g., fertilizer) to plants treated with the bioactivating composition of this invention.

EXAMPLE III

Cultures of *Bacillus subtilis* and *Chlorella saccharophila* were separately prepared and then combined and treated according to the following procedure to produce a plant growth-promoting microorganism mixture.

Preparation of the Bacterial Culture Component

Samples of *Bacillus subtilis* (obtained from the American Type Culture Collection of Rockville, Md. as ATCC No. 6461) were added to an enrichment medium consisting of lauryl tryptose broth (Difco #2041-02-7, Difco, Detroit, Mich.,) containing about 3.5% by volume lactose at a pH of 6.8 to 7.0. The mixture was incubated at a temperature of 35° C.±1° C. for 24 hours to complete replacement of lactose by $CO_2$. The pH of the mixture was adjusted to between 6.5 and 6.8 with the aid of a pH-sensitive dye (Bright Green Laboratory Bile, Difco #007-01-2). The mixture was then incubated at a temperature of 35° C.±1° C. for 24 hours.

Isolation of the culture was accomplished using a nutrient agar medium (Difco #0001-02) composed of 3 g/L beef extract, 5 g/L peptone (Difco) and 15 g/L agar at a pH of 6.8 to 7.0. The mixture was then incubated at a temperature of 44.5° C.±0.1° C. in a water-bath for 24 to 48 hours until a count of $5 \times 10^6$ cells/ml was achieved.

Preparation of the Algal Culture Component

Samples of *Chlorella saccharophila* (obtained from the American Type Culture Collection of Rockville, Md., U.S.A. as ATCC No. 30408) were added to an algal protose agar medium consisting of 15 to 20 g/L agar, 0.2 to 0.3 g/L sodium nitrate, 2 g/L calcium chloride, 0.5 g/L magnesium sulfate, 15 g/L potassium phosphate, 3.0 g/L sodium chloride, 7.0 to 8.0 g/L protose peptone, 0.2 g/L molybdenum sulfate, and balance to one liter de-ionized water at a pH of 6.5 to 6.8. The mixture was incubated at a temperature of 22° C. to 25° C. for 2 to 3 weeks in sunlight.

The mixture was transferred to a specific medium consisting of the algal protose agar medium described above but without molybdenum sulfate for 2 to 3 days to isolate the culture and achieve a count of $15 \times 10^6$ cells/ml. The count was determined by a microscopic count procedure. The culture was then centrifuged to separate the aqueous portion and the aqueous portion was discarded.

Preparation of the Microbial Plant Growth Regulating Composition

The bacterial and algal cultures as prepared above were mixed together for a total count of $20 \times 10^6$ cells/ml ($15 \times 10^6$ & cells/ml algae and $5 \times 10^6$ cells/ml bacteria). One gallon of the mixture was added to 9 gallons of whey plus one pint of soresepinum, and incubated at a temperature of 20° C. to 22° C. for 2 to 3 weeks. The culture was mixed and checked for count four times daily. After 10 days (approximately mid-cycle) one pint lipase (Difco #0431-63-3) was added. At the end of the incubation cycle, the pH was adjusted to 4±0.2 using lactic acid titration and sodium benzoate was added to achieve a concentration of 5 ppm. Finally, 2 gram/gallon of vitamin B-12 assay (Difco #6300-15-7) was added to produce the final product. The final product was stored at 55° F. to 65° F. away from sunlight.

EXAMPLE IV

Preparation of Humic Acid/Actinomyces Extract Composition (Composition A)

Composition A was prepared by mixing Actinomyces fermentation product (bioactivating composition) prepared as in Example I with conventionally prepared plant fertilizer having an N-P-K ratio of 14:7:3, along with a carboxylate derivative of humic acid (prepared as in Example II), trace element chelates (obtained from W.R. Grace and Co., Organic Chemicals Div., Lexington, Mass.) and inert material (water) to achieve the following mixture in weight percent:

| | |
|---|---|
| Actinomyces fermentation product (bioactivating composition) | 5-8% |
| Total nitrogen (60%) | 14% |
| Available phosphoric acid (32%) | 7% |
| Soluble potash (45%) | 3% |
| Humic acid derivative (carboxylate derivative, 13% humic acid) | 2% |
| Trace element chelates (30%) | 0.5% |
| Balance inert material (water) | 65.5-68.5% |
| Composition A | 100% |

EXAMPLE V

Composition B was prepared by mixing the final product of Example III with conventional plant fertilizer having an N-P-K ratio of 14:7:3, along with a carboxylate derivative of humic acid (prepared as in Example II), trace element chelates(W.R. Grace & Co.) soresepinum and water to give the following mixture in weight percent:

| | |
|---|---|
| Microorganism mixture (Example II) | 50% |
| Total nitrogen (60%) | 14% |
| Available phosphoric acid (32%) | 7% |
| Soluble potash (45%) | 3% |

| | |
|---|---|
| Humic acid (carboxylate derivative, 13%) | 5% |
| Trace element chelates (30%) | 0.5% |
| Soresepinum | 0.05% |
| Balance inert material (water) | 20.45% |
| Total | 100% |

EXAMPLE VI

The effect on growth of Composition A, as prepared by Example IV, was demonstrated on frost-damaged leatherleaf fern. Fifty square feet size plots were used per treatment. Treatments were: (1) 1 ml Comp. A/3 gal. water, (2) 2 ml Comp. A/3 gal. water, (3) 4 ml Comp. A/3 gal. water and (4) control-3 gal. water. Four sprays per month over a two-month period were done using a 3 gallon capacity hand sprayer at 20 psi. Field data were recorded on fresh weights of top, rhizome and roots and roots. The results are shown in Tables 1 and 2 below.

TABLE 1
Effect of Composition A Application on Growth of Leatherleaf Fern

| Treatment | Fresh Weight (g) | | |
|---|---|---|---|
| | Top | Root + Rhizome | Root |
| 1 ml Comp. A/3 gal. water | 30.0 | 28.2 | 2.6 |
| 2 ml Comp. A/3 gal. water | 22.0 | 31.2 | 2.4 |
| 4 ml Comp. A/3 gal. water | 45.0 | 40.0 | 4.8 |
| Control (3 gal. water) | 18.5 | 17.0 | 1.6 |

TABLE 2
Total Number of Bunches (Leatherleaf Fern) in Ten Harvests (Each Plot Size about 50 Sq. Ft.)

| Treatment | Yield (1 Bunch Contains 25 Fronds (Leaf)) | |
|---|---|---|
| | Bunches | Fronds |
| 1 ml Comp. A/3 gal. water | 34 | 850 |
| 2 ml Comp. A/3 gal. water | 47 | 1175 |
| 4 ml Comp. A/3 gal. water | 43 | 1075 |
| Control (3 gal. water) | 18 | 450 |

The data demonstrates that all treatments including Composition A increased the growth of frostdamaged leatherleaf fern as compared to the control. Composition A at the rate of 4 ml/3 gallons of water was superior as compared to the rest of the treatments. The fresh weight of the top, root, and rhizome and roots increased by 143, 135 and 200% respectively as compared to control.

EXAMPLE VII

The effects of Composition A (as prepared in Example IV) and Composition B (as prepared in Example V), were demonstrated on the growth of the following plant species: *Viburnum odoratissimum*, *Pittosporum tobria* and *Ilex cornuta* "Burfordii." Foliage was sprayed with Composition A or Composition B at 2 ml/3 gal. water or control (0 ml/3 gal. water), once a week during the test. The results over a 4-week period are shown in Table 3, and the results over a 12-week period are shown in Table. 4.

TABLE 3
Effect of Treatments on the Growth of Woody Ornamentals Over Four Weeks

| Name of Plant | | Characteristics | | |
|---|---|---|---|---|
| | | Height (Inches) | Plant Weight (g) | Root Length (Inches) |
| Viburnum odoratissimum | Comp. A | 6.3 ± 1.7 | 34.6 ± 1.2 | 4.5 ± 0.8 |
| | Comp. B | 6.8 ± 1.5 | 36.8 ± 1.1 | 4.9 ± 0.5 |
| | Control | 3.0 ± 0.3 | 15.5 ± 2.8 | 1.8 ± 0.5 |
| Pittosporum tobria | Comp. A | 7.8 ± 2.1 | 39.5 ± 1.8 | 5.6 ± 0.3 |
| | Comp. B | 8.1 ± 1.9 | 41.5 ± 1.7 | 6.1 ± 0.2 |
| | Control | 3.5 ± 0.3 | 13.5 ± 2.5 | 2.5 ± 0.6 |
| Ilex cornuta | Comp. A | 9.1 ± 1.9 | 65.5 ± 1.4 | 6.2 ± 0.2 |
| | Comp. B | 9.5 ± 2.1 | 67.5 ± 1.8 | 6.6 ± 0.3 |
| | Control | 4.1 ± 0.5 | 31.3 ± 1.6 | 2.7 ± 0.5 |

TABLE 4
Effect of Treatments on the Growth of Woody Ornamentals Over 12 Weeks

| Name of Plant | | Characteristics | | |
|---|---|---|---|---|
| | | Height (Inches) | Plant Weight (g) | Root Length (Inches) |
| Viburnum odoratissimum | Comp. A | 15.5 ± 0.3 | 64.5 ± 1.1 | 7.1 ± 0.3 |
| | Comp. B | 19.5 ± 0.3 | 126.6 ± 1.3 | 9.5 ± 0.8 |
| | Control | 6.2 ± 0.5 | 21.5 ± 1.5 | 2.5 ± 0.5 |
| Pittosporum tobria | Comp. A | 21.3 ± 0.3 | 119.5 ± 1.3 | 9.5 ± 0.2 |
| | Comp. B | 24.5 ± 0.5 | 128.3 ± 1.2 | 11.8 ± 0.3 |
| | Control | 6.5 ± 0.3 | 21.5 ± 0.8 | 3.5 ± 0.5 |
| Ilex cornuta | Comp. A | 16.3 ± 2.1 | 121.7 ± 0.5 | 10.8 ± 0.3 |
| | Comp. B | 18.5 ± 2.5 | 125.5 ± 1.2 | 12.5 ± 0.5 |
| | Control | 7.5 ± 0.5 | 40.8 ± 1.1 | 4.2 ± 0.3 |

The data demonstrates that both Composition A and Composition B results in substantial increases in plant height, plant weight and root length over control.

What is claimed is:

1. A method for preparing a bioactivating composition for increased plant growth and yields which comprises growing a microorganism of the genus "Actinomyces" in a first nutrient medium comprising assimilable sources of carbon and nitrogen under growth conditions to a cell density of from about $2 \times 10^6$ to about $4 \times 10^6$ cells/ml, adding to the first nutrient medium from about 1% to about 10% by weight of disrupted sea kelp or sea kelp extract to form a second nutrient medium containing assimilable sources of carbon and nitrogen, and further growing the microorganism in the second nutrient medium under growth conditions to a second cell density of about $5 \times 10^6$ cells/ml or greater; said growth conditions including a physiologically acceptable pH and temperature.

2. The method of claim 1 further including the step of removing insolubles from said second medium after the microorganism is grown to said second cell density, to provide an aqueous bioactivating composition.

3. The method of claim 2 wherein the microorganism is *Actinomyces roseus*, *Actinomyces gypsoides* or a mixture thereof.

4. The method of claim 3 wherein the microorganism is grown to a cell density of from about $2.5 \times 10^6$ to about $3.5 \times 10^6$ cells/ml in the first nutrient medium, and then grown to a cell density of from about $5.5 \times 10^6$ to about $7.5 \times 10^6$ cells/ml in the second nutrient medium.

5. The method of claim 3 wherein the microorganism is grown to a cell density of from about $2.7 \times 10^6$ to about $3.3 \times 10^6$ cells/ml in the first nutrient medium, and then grown to a cell density of from about $6 \times 10^6$ to about $7 \times 10^6$ cells/ml in the second nutrient medium, the second nutrient medium containing from about 2% to about 7% by weight of said sea kelp extract.

6. The method of claim 3 wherein the microorganism is grown to a cell density of about $3 \times 10^6$ cells/ml in the first nutrient medium, and then grown to a cell density of from about $6 \times 10^6$ to about $7 \times 10^6$ cells/ml in the second nutrient medium, the second nutrient medium containing about 5% by weight of said sea kelp extract.

7. The method of claim 4 wherein the microorganism is *Actinomyces roseus*.

8. The method of claim 4 wherein the microorganism is *Actinomyces gypsoides*.

9. The method of claim 5 wherein the microorganism is *Actinomyces roseus*.

10. The method of claim 5 wherein the microorganism is *Actinomyces gypsoides*.

11. The method of claim 6 wherein the microorganism is *Actinomyces roseus*.

12. The method of claim 6 wherein the microorganism is *Actinomyces gypsoides*.

13. The method of claim 6 wherein the first nutrient medium initially has a pH of about 6.8–7 and contains about 3.5% by volume lactose as a carbon source, the microorganism is grown in the first medium for about 24 hours at about 35° C. to substantially deplete the lactose, the pH of the first nutrient medium then adjusted to about 6.8–7.0 and about 5–6% by volume lactose is added to the first nutrient medium, the first nutrient medium then is incubated about 8–10 hours at about 35° C. to achieve a cell count of about $3 \times 10^6$ cells/ml, then about 5% by weight of said sea kelp extract is added to the first nutrient medium to form said second nutrient medium, and said microorganism then is grown in said second medium at a temperature of about 38° –40° C. for a period of about 16 hours at a pH of about 6.2–6.5 to achieve a cell count of from about $6 \times 10^6$ to about $7 \times 10^6$ cells/ml.

14. A bioactivating composition produced according to the method of claim 3.

15. A bioactivating composition produced according to the method of claim 5.

16. A bioactivating composition produced according to the method of claim 6.

17. A bioactivating composition produced according to the method of claim 11.

18. A bioactivating composition produced according to the method of claim 12.

19. A bioactivity ,composition produced according to the method of claim 13.

20. The composition of claim 17 further including a material non-toxic to plants, the non-toxic material being a foliar surfactant, penetrant or wetting agent.

21. The composition of claim 18 further including a material non-toxic to plants, the non-toxic material being a foliar surfactant, penetrant or wetting agent.

22. The composition of claim 14 further including a material non-toxic to plants, the non-toxic material being a foliar surfactant, penetrant or wetting agent.

23. The composition of claim 20 wherein said non-toxic material is an acidification extraction product of humic acid and comprises up to about 5% by weight of said composition.

24. The composition of claim 21 wherein said non-toxic material is an acidification extraction product of humic acid and comprises up to about 5% by weight of said composition.

25. The composition of claim 22 wherein said non-toxic material is an acidification extraction product of humic acid and comprises up to about 5% by weight of said composition.

26. The composition of claim 15 further including up to about 5% by weight of a carboxylate derivative of humic acid.

27. The composition of claim 16 further including up to about 5% by weight of a carboxylate derivative of humic acid.

28. The composition of claim 17 further including up to about 5% by weight of a carboxylate derivative of humic acid.

29. The composition of claim 18 further including up to about 5% by weight of a carboxylate derivative of humic acid.

30. The composition of claim 19 further including up to about 5% by weight of a carboxylate derivative of humic acid.

31. The composition of claim 15 further including from about 0.1% to about 3% by weight of a carboxylate derivative of humic acid.

32. The composition of claim 16 further including from about 0.1% to about 3% by weight of a carboxylate derivative of humic acid.

33. The composition of claim 17 further including from about 0.1% to about 3% by weight of a carboxylate derivative of humic acid.

34. The composition of claim 18 further including from about 0.1% to about 3% by weight of a carboxylate derivative of humic acid.

35. The composition of claim 19 further including from about 0.1% to about 3% by weight of a carboxylate derivative of humic acid.

36. The composition of claim 17 further including from about 0.2% to about 0.3% by weight of a carboxylate derivative of humic acid.

37. The composition of claim 18 further including from about 0.2% to about 0.3% by weight of a carboxylate derivative of humic acid.

38. The composition of claim 19 further including from about 0.2% to about 0.3% by weight of a carboxylate derivative of humic acid.

39. A method for promoting the growth of a plant comprising administering to a plant a growth-promoting amount of the composition of claim 14.

40. A method for promoting the growth of plants comprising spraying plant foliage with a growth-promoting amount of the composition of claim 27.

41. A method for promoting the growth of plants comprising spraying plant foliage with a growth-promoting amount of the composition of claim 32.

42. A method for promoting the growth of plants comprising spraying plant foliage with a growth-promoting amount of the composition of claim 36.

43. A method for promoting the growth of plants comprising spraying plant foliage with a growth-promoting amount of the composition of claim 37.

44. A method for promoting the growth of plants comprising spraying plant foliage with a growth-promoting amount of the composition of claim 38.

45. The method of claim 40 wherein the composition further includes assimilable sources of nitrogen, phosphorous potassium and trace elements.

46. The method of claim 41 wherein the composition further includes assimilable sources of nitrogen, phosphorous potassium and trace elements.

47. The method of claim 42 wherein the composition further includes assimilable sources of nitrogen, phosphorous potassium and trace elements.

48. The method of claim 43 wherein the composition further includes assimilable sources of nitrogen, phosphorous potassium and trace elements.

49. A method for increasing Phosphofructo Kinase activity in plants comprising administering to the plants an activation-enhancing amount of the composition of claim 16.

50. A method for increasing plant growth and yield comprising applying to a plant a growth-promoting amount of the composition of claim 16.

51. A bioactivating composition for promoting plant growth and yields comprising:

(a) an absorption-promoting carrier material comprising an acidification extraction product of humic acid, and (b) a microbial plant growth-promoting composition produced by growing a bacterial culture in a first nutrient medium under growth conditions to a cell density of from about $2 \times 10^6$ to about $10 \times 10^6$ cells/ml; growing an algal culture in a second nutrient medium under growth conditions to a cell density of from about $10 \times 10^6$ to about $20 \times 10^6$ cells/ml, and then mixing the bacterial and algal cultures together and incubating the mixture in a third nutrient medium under growth conditions at a temperature of from about 10° C. to about 40° C. to produce the microbial mixture; said growth conditions including a physiologically acceptable pH and temperature;

wherein the ratio by weight of carrier material to microbial composition is from about 1:2 to about 1:200.

52. The composition of claim 51 wherein the bacteria is *B. subtilis* and is present in said microbial mixture at a concentration of from about $4 \times 10^6$ to about $6 \times 10^6$ cells/ml, and the algae is *C. saccharophila* and is present in said microbial mixture at a concentration of from about $14 \times 10^6$ to about $16 \times 10^6$ cells/ml.

53. The composition of claim 51 wherein the carrier material is a carboxylate derivative of humic acid, and the ratio by weight of said derivative to said microbial mixture in said composition is from about 1:65 to about 1:85.

54. A method for promoting growth of plants comprising spraying plant foliage with a growth-promoting amount of the composition of claim 51.

55. A method for promoting growth of plants comprising spraying plant foliage with a growth-promoting amount of the composition of claim 52.

56. A method for promoting growth of plants comprising spraying plant foliage with a growth-promoting amount of the composition of claim 53.

* * * * *